Feb. 19, 1929.

V. H. TODD 1,702,454

PROTECTIVE RELAY

Filed Dec. 8, 1925

WITNESSES:
R. S. Harrison
E. K. Evans

INVENTOR
Victor H. Todd
BY
Chesley G. Carr
ATTORNEY

Patented Feb. 19, 1929.

1,702,454

UNITED STATES PATENT OFFICE.

VICTOR H. TODD, OF SUMMIT, NEW JERSEY, ASSIGNOR TO WESTINGHOUSE ELECTRIC & MANUFACTURING COMPANY, A CORPORATION OF PENNSYLVANIA.

PROTECTIVE RELAY.

Application filed December 8, 1925. Serial No. 74,215.

My invention relates to protective relays and particularly to reverse-phase or open-phase relays for polyphase systems.

An object of my invention is to provide a relay of the induction type having a movable armature member and a plurality of inductively-related windings for controlling the same in case the associated circuit becomes unbalanced, one of the phase conductors of the circuit is opened or the phase rotation of the circuit is reversed.

In accordance with my invention as applied to a three-phase circuit, a relay is provided having a plurality of windings energized from three current transformers connected in the respective phase conductors of the circuit.

The relay comprises four windings, three of which are disposed in close proximity to each other on one portion of the magnetizable core member of the relay and the fourth is disposed upon a spaced portion of the core member cooperating with the first-mentioned portion to establish a traveling magnetic field traversing the relay armature member under predetermined conditions of energization of the several windings. The three adjacent windings are connected to the three current transformers and the fourth winding is so connected to the three other windings that a travelling magnetic field in one direction is established under normal balanced-current conditions in the polyphase circuit and the field becomes reversed if the currents become substantially unbalanced or the current traversing one of the phase conductors fails or is reversed. The fourth winding may be connected to a fifth winding inductively related to the other three windings, if desired.

Figure 1:
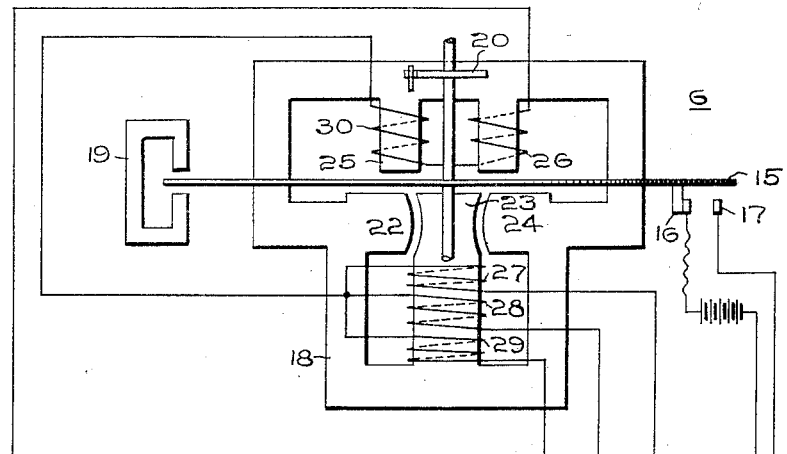
Figure 1:
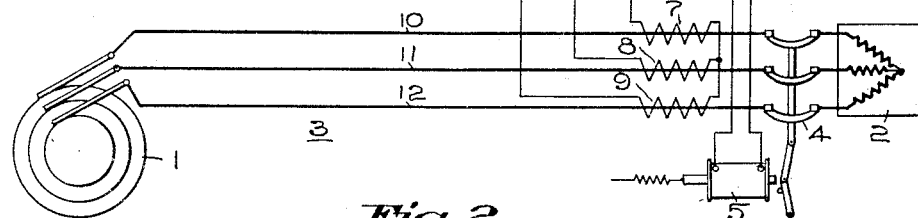
Figure 2:
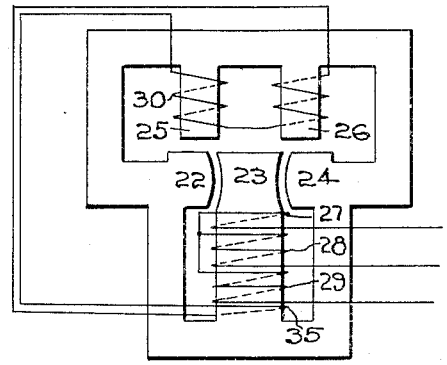

For a better understanding of my invention, reference should be had to the accompanying drawings, of which Fig. 1 is a diagrammatic view of a relay embodying my invention as applied to the protection of a three-phase circuit; and Fig. 2 is a similar view of a modified form of relay embodying my invention.

The system shown in Fig. 1 comprises a three-phase alternator 1 connected to a polyphase load device 2 through a circuit 3 and a circuit-interrupter 4. The circuit-interrupter 4 is provided with a trip coil 5, the energization of which is controlled by a protective relay 6 having windings connected to the secondary windings of three current transformers 7, 8 and 9 in the respective phase conductors 10, 11 and 12 of the circuit 3.

The relay 6 comprises a movable armature member 15 carrying a contact member 16 adapted to cooperate with a stationary contact member 17 to close the circuit of the trip coil 5 of the circuit-interrupter 4. An electromagnet 18, a permanent damping magnet 19 and a control spring 20 cooperate to control the armature member 15 in accordance with the conditions obtaining in the circuit 3.

The electromagnet 18 comprises a magnetizable core member having three lower pole pieces 22, 23 and 24 and two upper opposing pole pieces 25 and 26. Three equal inductively-related star-connected windings 27, 28 and 29 are disposed upon the lower central pole piece 23. A winding 30 that is wound in opposite directions upon the upper pole pieces 25 and 26 cooperates with the windings 27, 28 and 29 to establish a traveling magnetic field traversing the armature member 15 under predetermined conditions of energization of the respective windings.

The terminals of the star-connected windings 27, 28 and 29 are connected to the terminals of the secondary windings of the current transformers 7, 8 and 9, one terminal of each of the secondary windings of the current transformers 7, 8 and 9 being connected together. The winding 30 is connected in shunt relation to one of the lower-pole windings, for instance the winding 29, in such manner that the latter winding is traversed by a smaller current than the windings 27 and 28. Therefore, even under balanced conditions, when the currents traversing the secondary windings of the transformers 7, 8 and 9 are equal, magnetic fluxes thread the upper and lower pole pieces of the electromagnet 18, since the resultant of the currents in the winding 27, 28 and 29 is not zero.

The upper and the lower pole pieces of the electromagnet 18 are laterally spaced in order to establish a traveling magnetic field in a predetermined direction traversing the armature member 15 when the magnetic fluxes emanating from the respective sets of pole pieces are out of phase. The direction of the torque on the armature member 15 depends upon whether the magnetic fluxes from the upper pole pieces 25 and 26 are leading or lagging the resultant fluxes produced by the lower pole pieces 22, 23, and 24 traversing the armature member 15.

Under normal conditions when the currents traversing the phase conductors 10, 11 and 12 are approximately balanced, the currents traversing the respective relay windings 27, 28 and 29 produce a torque upon the armature member 15 of the relay in such direction as to maintain the contact members 16 and 17 open. A back-stop and the controlling spring 20 are provided in connection with the armature member 15 to maintain a definite normal relation between the contact members 16 and 17.

If one of the phase conductors 10, 11 and 12 becomes open-circuited or the phase rotation of the circuit 3 is reversed, it is desirable to open the circuit-interrupter 4 to disconnect the load 2. The load 2 may be a polyphrase motor, for instance, that would continue to run single-phase if one of the phase conductors of the circuit is interrupted although the motor would overheat under these conditions.

If we assume that the phase conductor 10 is open-circuited, the current traversing the winding 27 is reduced and the magnetic flux in the pole piece 23 produced by the energization of the windings 28 and 29 is so modified as to reverse the torque on the armature member 15, thereby closing the contact members 16 and 17 to actuate the circuit-interrupter 4. The operation is the same in case either of the phase conductors 11 or 12 is open-circuited or the currents in the respective phase conductors are substantially unbalanced from any cause. Likewise, if any of the phase conductors of the circuit 3 are transposed or the normal phase rotation is reversed in any manner, the energization of the windings 27, 28 and 29 is so modified as to reverse the torque on the armature member 15 and effect the energization of the trip coil 5 of the circuit-interrupter.

In Fig. 2 is shown a modified form of relay in which the windings 27, 28 and 29 are unsymmetrical and the winding 30 is energized through the instrumentality of a fifth winding 35 inductively related to the windings 27, 28 and 29. The operation of this relay is the same as that described above. Since the windings 27, 28 and 29 are unsymmetrical, one of the windings 27 having a fewer number of turns than the other windings, a magnetic flux traverses the pole piece 23 under balanced conditions, thereby energizing the winding 30 to establish a normal or restraining magnetic field. The direction of this traveling magnetic field reverses under unbalanced conditions, and the relay armature member is actuated to the circuit-closing position.

The relay embodying my invention operates upon a predetermined current relation in a polyphase circuit and therefore possesses a considerable advantage over open-phase relays operating upon a predetermined voltage relation in the case of polyphase loads comprising motors. In case of an open phase, such motors will run single-phase and tend to maintain the voltages of the circuit substantially balanced although the currents are badly unbalanced.

While I have shown and described in detail a relay that has proven to be extremely sensitive to variations in the normal phase relations of the currents traversing a polyphase circuit, I do not consider that my invention is limited to the precise details shown and described. Many changes in the construction of the electromagnet 20, for instance, without departing from the scope of my invention, will occur to those skilled in the art. I do not desire that any limitations shall be imposed upon my invention therefore except as may be indicated in the appended claims.

I claim as my invention:

1. A protective relay comprising a magnetizable core member having opposed pole pieces separated by an air gap, an armature disposed in said air gap, a plurality of inductively-related windings on one of the pole pieces and a winding on an opposed pole piece connected in shunt relation to one of said first-mentioned windings.

2. A protective relay comprising a movable armature, opposed pole pieces for controlling the movement of said armature, star-connected windings on one of said pole pieces, and a winding on another of said pole pieces connected in shunt relation to one of said windings.

3. A protective relay comprising a movable armature, two upper and three lower opposed pole pieces for controlling the same, star-connected windings on the central lower pole piece, and a winding for said upper pole pieces energized in accordance with the resultant energization of the first-mentioned windings.

4. A protective relay comprising a movable armature, two upper and a lower opposed pole piece for controlling the same, a plurality of windings on the lower pole piece and another winding wound in opposite directions on said upper pole pieces and connected in shunt relation to one of said windings on the lower pole piece.

5. A protective relay for a three-phase circuit comprising a movable conducting armature and means for establishing a traveling magnetic field traversing said armature, said means including two windings energized in accordance with the currents traversing two phase conductors of said circuit, respectively, and two windings energized in accordance with the current traversing the third phase conductor of the circuit.

6. A protective relay for a three-phase circuit comprising a movable conducting armature and means for establishing a traveling magnetic field traversing said armature member under predetermined conditions in the circuit, said means comprising an electromagnet having two upper and three lower opposed pole pieces, two windings on the lower central pole piece energized in accordance with the currents traversing two phase conductors of the circuit, respectively, and two other windings, one disposed in inductive relation to the first-mentioned windings and the other disposed upon the upper pole pieces of the electromagnet, the said two other windings being connected in parallel to be energized by the third phase conductor of the circuit.

7. A protective relay for a three-phase circuit comprising a movable conducting armature and means for establishing a travelling magnetic field normally traversing said armature member in one direction, said means including three current transformers connected in the respective phase conductors of the circuit and a plurality of windings adjacent to the armature member connected to said transformers and an auxiliary winding arranged to cooperate with said windings to establish a reversed travelling magnetic field if any of the phase conductors of the circuit becomes deenergized.

In testimony whereof, I have hereunto subscribed my name this 17th day of November, 1925.

VICTOR H. TODD.